US010921010B2

(12) United States Patent
Park et al.

(10) Patent No.: US 10,921,010 B2
(45) Date of Patent: Feb. 16, 2021

(54) BUILDING MANAGEMENT SYSTEM WITH SIMULATION AND USER ACTION REINFORCEMENT MACHINE LEARNING

(71) Applicant: Johnson Controls Technology Company, Auburn Hills, MI (US)

(72) Inventors: Youngchoon Park, Brookfield, WI (US); Sudhi R. Sinha, Milwaukee, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 121 days.

(21) Appl. No.: 16/013,638

(22) Filed: Jun. 20, 2018

(65) Prior Publication Data

US 2018/0372363 A1   Dec. 27, 2018

Related U.S. Application Data

(60) Provisional application No. 62/523,247, filed on Jun. 21, 2017.

(51) Int. Cl.
| | | |
|---|---|---|
| *F24F 11/63* | (2018.01) | |
| *G05B 13/04* | (2006.01) | |
| *G05B 13/02* | (2006.01) | |
| *F24F 11/46* | (2018.01) | |
| *F24F 11/77* | (2018.01) | |

(Continued)

(52) U.S. Cl.
CPC .............. *F24F 11/63* (2018.01); *F24F 11/46* (2018.01); *F24F 11/62* (2018.01); *F24F 11/77* (2018.01); *G05B 13/0265* (2013.01); *G05B 13/048* (2013.01); *G05B 15/02* (2013.01); *F24F 11/79* (2018.01); *F24F 2120/00* (2018.01); *F24F 2130/10* (2018.01); *G05B 2219/2642* (2013.01)

(58) Field of Classification Search
CPC .. F24F 11/63; F24F 11/62; F24F 11/77; F24F 11/46; F24F 2120/00; F24F 11/79; F24F 2130/10; G05B 15/02; G05B 13/0265; G05B 2219/2642; G05B 13/048
See application file for complete search history.

(56) References Cited

U.S. PATENT DOCUMENTS 9,817,383 B1    11/2017  Sinha et al.
10,152,298 B1 * 12/2018  Salvador ................. G06F 3/167
(Continued)

OTHER PUBLICATIONS

Browne et al., A Survey of Monte Carlo Tree Search Methods, IEEE Transactions on Computational Intelligence and AI in Games, Mar. 2012, 49 pages.

*Primary Examiner* — Thomas C Lee
*Assistant Examiner* — Charles Cai
(74) *Attorney, Agent, or Firm* — Foley & Lardner LLP

(57) ABSTRACT

A method for controlling energy usage of one or more building devices associated with a building space including determining, by the one or more processing circuits based on a simulation, penalties associated with the one or more varied operating values of the one or more building devices, wherein the penalties indicate user behavior that causes energy inefficiency of the one or more building devices, and selecting, by the one or more processing circuits, one or more optimal operating values from the varied one or more operating values based on one or more future environmental conditions and a number of the penalties associated with each of the one or more varied operating values.

20 Claims, 9 Drawing Sheets

(51) Int. Cl.
*G05B 15/02* (2006.01)
*F24F 11/62* (2018.01)
*F24F 130/10* (2018.01)
*F24F 120/00* (2018.01)
*F24F 11/79* (2018.01)

(56) References Cited

U.S. PATENT DOCUMENTS

| | | | | |
|---|---|---|---|---|
| 2009/0171478 A1* | 7/2009 | Wong | ............... | G08G 1/04 |
| | | | | 700/13 |
| 2010/0083950 A1* | 4/2010 | Bloxam | ............... | F24D 11/003 |
| | | | | 126/585 |
| 2012/0101648 A1* | 4/2012 | Federspiel | ......... | G05D 23/1934 |
| | | | | 700/291 |
| 2014/0316584 A1* | 10/2014 | Matsuoka | ............... | F24F 11/62 |
| | | | | 700/278 |
| 2015/0276237 A1* | 10/2015 | Daniels | ............ | F24D 19/10 |
| | | | | 237/2 A |
| 2015/0312696 A1* | 10/2015 | Ribbich | ............ | H04W 4/33 |
| | | | | 455/418 |
| 2016/0146497 A1* | 5/2016 | Chapman | ............ | G06K 7/0008 |
| | | | | 700/276 |
| 2016/0178222 A1* | 6/2016 | Bush | ............... | F24F 3/1405 |
| | | | | 62/176.1 |
| 2017/0322534 A1 | 11/2017 | Sinha et al. | | |

* cited by examiner

| Condition | AHU-Action | VAV Action | Sunlight | OAT | Indoor Temp Before | Indoor Temp After | Opportunities | Penalty | Observations | Prob (%) |
|---|---|---|---|---|---|---|---|---|---|---|
| 1 | MED | 75% | DIRECT | 72°F | 68°F | 70°F | 385 | O-WIFE | 9 | 2.3 |
| 2 | HIGH | 50% | INDIRECT | 77°F | 68°F | 79°F | 325 | O-HUSBAND | 88 | 22.9 |
| . | . | . | . | . | . | . | . | . | . | . |
| . | . | . | . | . | . | . | . | . | . | . |
| . | . | . | . | . | . | . | . | . | . | . |
| . | . | . | . | . | . | . | . | . | . | . |
| . | . | . | . | . | . | . | . | . | . | . |
| . | . | . | . | . | . | . | . | . | . | . |
| . | . | . | . | . | . | . | . | . | . | . |
| . | . | . | . | . | . | . | . | . | . | . |
| 2+n | | | | | | | | | | |

FIG. 9

BUILDING MANAGEMENT SYSTEM WITH SIMULATION AND USER ACTION REINFORCEMENT MACHINE LEARNING

CROSS-REFERENCE TO RELATED PATENT APPLICATION

This application claims the benefit of and priority to U.S. Provisional Patent Application No. 62/523,247 filed Jun. 21, 2017, the entire disclosure of which is incorporated by reference herein.

BACKGROUND

The present disclosure relates generally to the field of building automation systems. A building automation system (BAS) is, in general, a system of devices configured to control, monitor, and manage equipment in or around a building or building area. The BAS system may include one or more HVAC devices, which control and regulate various environmental factors within a building. Environmental factors may include temperature, humidity, etc. Often, these environmental factors are associated with providing a comfort level for one or more occupants of the building. Many BAS systems operate to control the environmental factor based on certain setpoints. However, various factors may adversely affect the ability of the BAS to regulate the environmental factors, requiring setpoint or other changes to the system. Further, these factors may result in a user modifying the operation of the BAS to obtain the quality level they desire.

SUMMARY

One implementation of the present disclosure is a method for controlling energy usage of one or more building devices associated with a building space. The method includes simulating, by one or more processing circuits, one or more operating values of the one or more building devices for environmental conditions by varying the one or more operating values and determining, by the one or more processing circuits based on the simulation, penalties associated with the one or more varied operating values of the one or more building devices, wherein the penalties indicate user behavior that causes energy inefficiency of the one or more building devices. The method includes selecting, by the one or more processing circuits, one or more selected operating values from the varied one or more operating values based on one or more future environmental conditions and a number of the penalties associated with each of the one or more varied operating values and operating, by the one or more processing circuits, the one or more building devices to control a physical condition of the building space based on the one or more selected operating values.

In some embodiments, the penalty is an unscheduled environmental setpoint change initiated by a user, wherein the unscheduled environmental setpoint change includes a change to at least one temperature setpoint.

In some embodiments, the method further includes modifying, by the one or more processing circuits, an operating schedule of the one or more building devices based on the one or more selected operating values. In some embodiments, operating, by the one or more processing circuits, the one or more building devices based on the one or more selected operating values includes operating, by the one or more processing circuits, the one or more building devices to control the physical condition of the building space based on the operating schedule.

In some embodiments, selecting, by the one or more processing circuits, the one or more selected operating values from the varied operating values includes determining the number of penalties associated with each of the one or more varied operating values and selecting the one or more selected operating values to be one or more least penalized varied operating values of the one or more varied operating values, the one or more least penalized varied operating values being associated with a least number of the penalties for the future environmental conditions.

In some embodiments, the future environmental conditions are at least one of a weather forecast and predicted future environmental conditions. In some embodiments, the method includes at least one of receiving, by the one or more processing circuits, the weather forecast from a weather server via a network and determining, by the one or more processing circuits, the predicted future environmental conditions by predicting the environmental conditions based on historical environmental condition data and one or more models.

In some embodiments, simulating, by the one or more processing circuits, the one or more operating values of the one or more building devices for the environmental conditions further includes physically operating, by the one or more processing circuits, the one or more building devices based on the varied one or more operating values and monitoring whether an environmental setpoint is changed.

In some embodiments, monitoring the resulting change in the environmental setpoint includes determining whether a user changes a value of the environmental setpoint. In some embodiments, determining, by the one or more processing circuits, the penalties associated with the one or more varied operating values includes determining a number of times the user changes the value of the environmental setpoint for each of the one or more varied operating values.

In some embodiments, the one or more building devices include an air handler unit (AHU) and a variable air volume (VAV) unit. In some embodiments, varying the one or more operating values includes varying an AHU fan speed and varying a VAV unit damper position. In some embodiments, operating, by the one or more processing circuits, the one or more building devices based on the one or more varied operating values includes controlling the AHU and the VAV unit based on the varied AHU fan speed and the varied VAV unit damper position.

In some embodiments, the method further includes generating, by the one or more processing circuits, a data structure based on the simulation. In some embodiments, the data structure includes the one or more varied operating values, the environmental conditions, and the penalties. In some embodiments, selecting, by the one or more processing circuits, the one or more selected operating values includes selecting the one or more selected operating values from the data structure.

In some embodiments, the data structure includes, for each of the one or more operating values, values of the environmental conditions associated with each of the one or more varied operating values and a number of the penalties associated with each of the one or more varied operating values.

In some embodiments, for each of the one or more varied operating values, the data structure includes an associated one or more weather values, wherein the one or more weather values are the weather values at the time that the operating value was varied, a number of observations of the operating value, and the number of the penalties.

In some embodiments, for each of the one or more varied operating values, the data structure further includes a penalty probability, the penalty probability based on the number of observations of the operating value and the number of penalties.

In some embodiments, selecting, by the one or more processing circuits, the one or more selected operating values from the one or more varied operating values for the one or more future environmental conditions includes selecting the one or more selected operating values based on a lowest probability of the penalty probability for each of the one or more varied operating values.

Another implementation of the present invention is a controller for controlling energy usage of one or more building devices associated with a building space. The controller includes a processing circuit configured to simulate one or more operating values of the one or more building devices for environmental conditions by varying the one or more operating values and determine penalties associated with the one or more varied operating values of the one or more building devices, wherein the penalties indicate user behavior that causes energy inefficiency of the one or more building devices. The processing circuit is configured to select one or more selected operating values from the varied one or more operating values based on one or more future environmental conditions and a number of the penalties associated with each of the one or more varied operating values by determining the number of penalties associated with each of the one or more varied operating values and selecting the one or more selected operating values to be one or more least penalized varied operating values of the one or more varied operating values, the one or more least penalized varied operating values being associated with a least number of the penalties for the future environmental conditions. The processing circuit is configured to operate the one or more building devices to control a physical condition of the building space based on the one or more selected operating values.

In some embodiments, the penalty is an unscheduled environmental setpoint change initiated by a user, wherein the unscheduled environmental setpoint change includes a change to at least one temperature setpoint.

In some embodiments, the processing circuit is configured to modify an operating schedule of the one or more building devices based on the one or more selected operating values. In some embodiments, the processing circuit is configured to operate the one or more building devices based on the one or more selected operating values by operating the one or more building devices to control the physical condition of the building space based on the operating schedule.

In some embodiments, the processing circuit is configured to simulate the one or more operating values of the one or more building devices for the environmental conditions by physically operating, by the one or more processing circuits, the one or more building devices based on the varied one or more operating values and monitoring whether an environmental setpoint is changed.

In some embodiments, the processing circuit is configured to generate a data structure based on the simulation, wherein the data structure includes the one or more varied operating values, the environmental conditions, and the penalties. In some embodiments, the processing circuit is configured to select the one or more selected operating values by selecting the one or more selected operating values from the data structure. In some embodiments, for each of the one or more varied operating values, the data structure includes an associated one or more weather values, wherein the one or more weather values are the weather values at the time that the operating value was varied, a number of observations of the operating value, and the number of the penalties.

Another implementation of the present disclosure is an energy system for controlling energy usage of one or more building devices associated with a building space. The system includes one or more processing circuits configured to simulate one or more operating values of the one or more building devices for environmental conditions by varying the one or more operating values and determine based on the simulation, penalties associated with the one or more varied operating values of the one or more building devices, wherein the penalties indicate user behavior that causes energy inefficiency of the one or more building devices, wherein the penalty is an unscheduled environmental setpoint change initiated by a user, wherein the unscheduled environmental setpoint change includes a change to at least one temperature setpoint. The one or more processing circuits are configured to select one or more selected operating values from the varied one or more operating values based on one or more future environmental conditions and a number of the penalties associated with each of the one or more varied operating values and operate the one or more building devices to control a physical condition of the building space based on the one or more selected operating values.

In some embodiments, the one or more processing circuits are configured to select the one or more selected operating values from the varied operating values by determining the number of penalties associated with each of the one or more varied operating values and selecting the one or more selected operating values to be one or more least penalized varied operating values of the one or more varied operating values, the one or more least penalized varied operating values being associated with a least number of the penalties for the future environmental conditions.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 9 is a graphical representation of a data structure, according to some embodiments.

DETAILED DESCRIPTION

Building Management System and HVAC System

Figure 1:
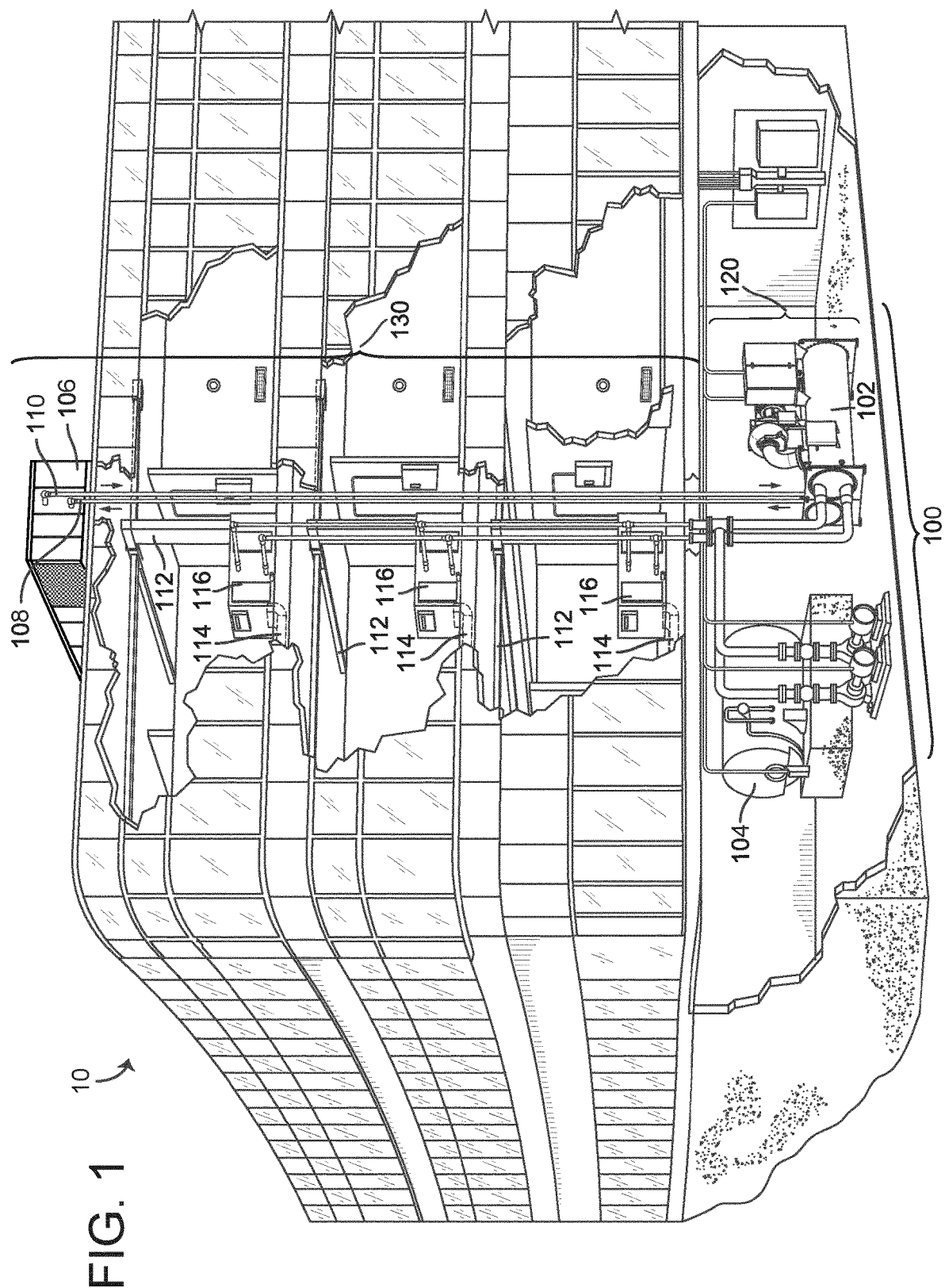
FIG. 1 is a schematic drawing of a building equipped with a building management system (BMS) and a HVAC system, according to some embodiments.

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 includes a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 includes a chiller 102, a boiler 104, and a rooftop air handling unit (AHU) 106 in some embodiments. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 includes a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
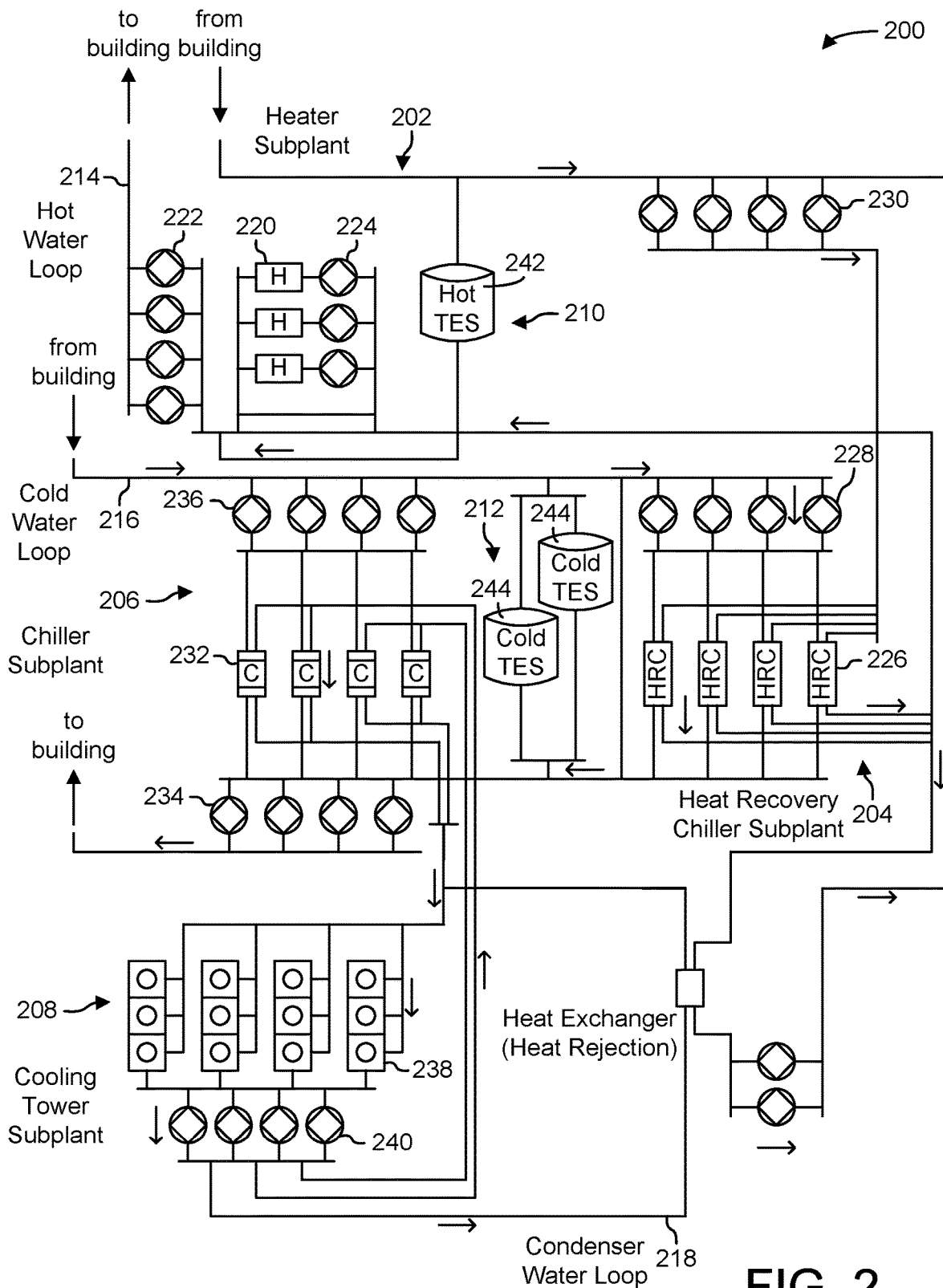
FIG. 2 is a schematic drawing of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 includes a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 includes a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 includes a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 includes a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 includes a hot TES tank 242 configured to store the hot water for later use. Hot TES subplant 210 can also include one or more pumps or valves configured to control the flow rate of the hot water into or out of hot TES tank 242. Cold TES subplant 212 includes cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
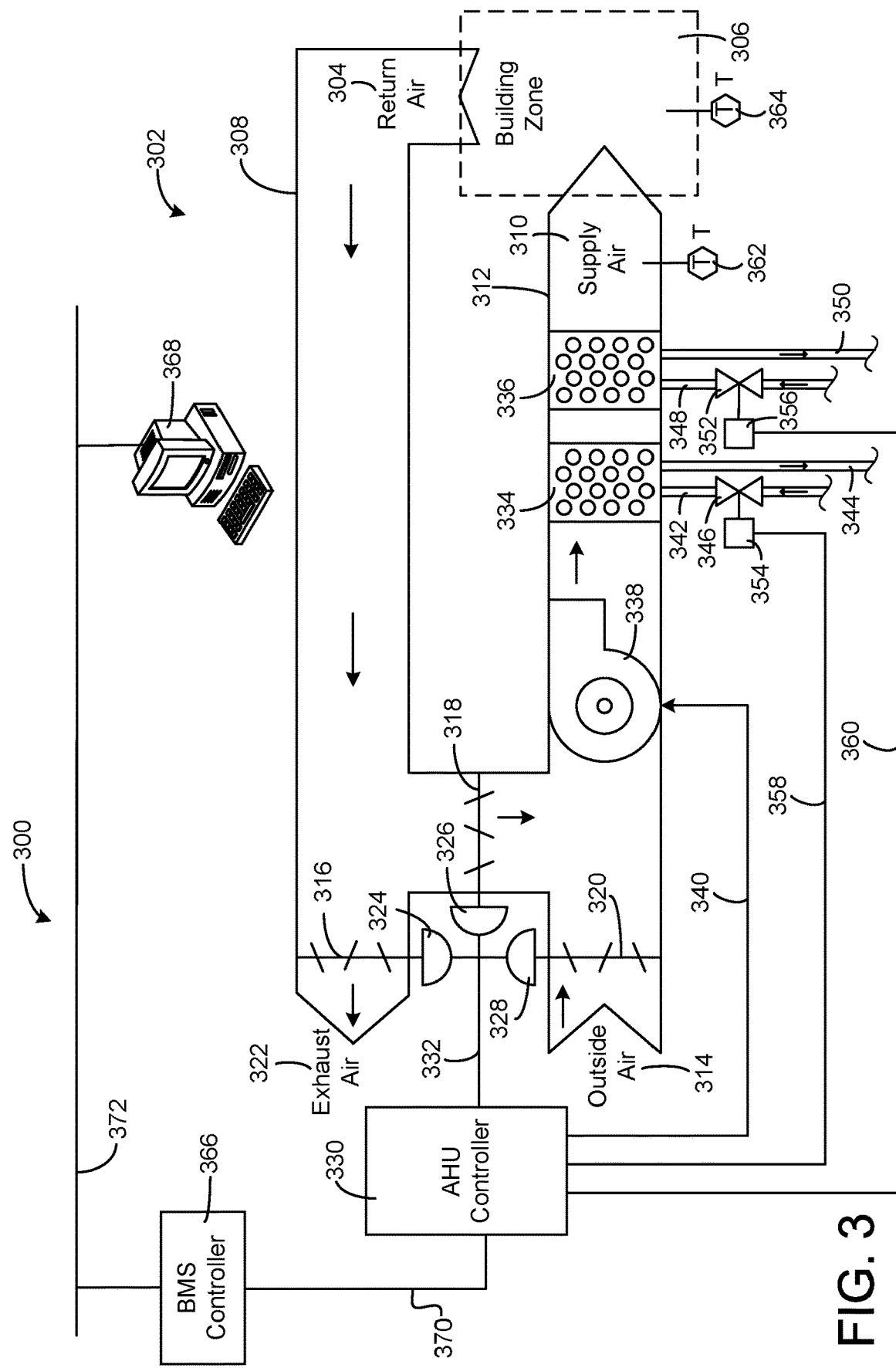
FIG. 3 is a schematic block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 includes an economizer-type air handling unit (AHU) 302. Economizer-type AHUs vary the amount of outside air and return air used by the air handling unit for heating or cooling in some embodiments. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 includes a cooling coil 334, a heating coil 336, and a fan 338 positioned within supply air duct 312 in some embodiments. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 includes a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
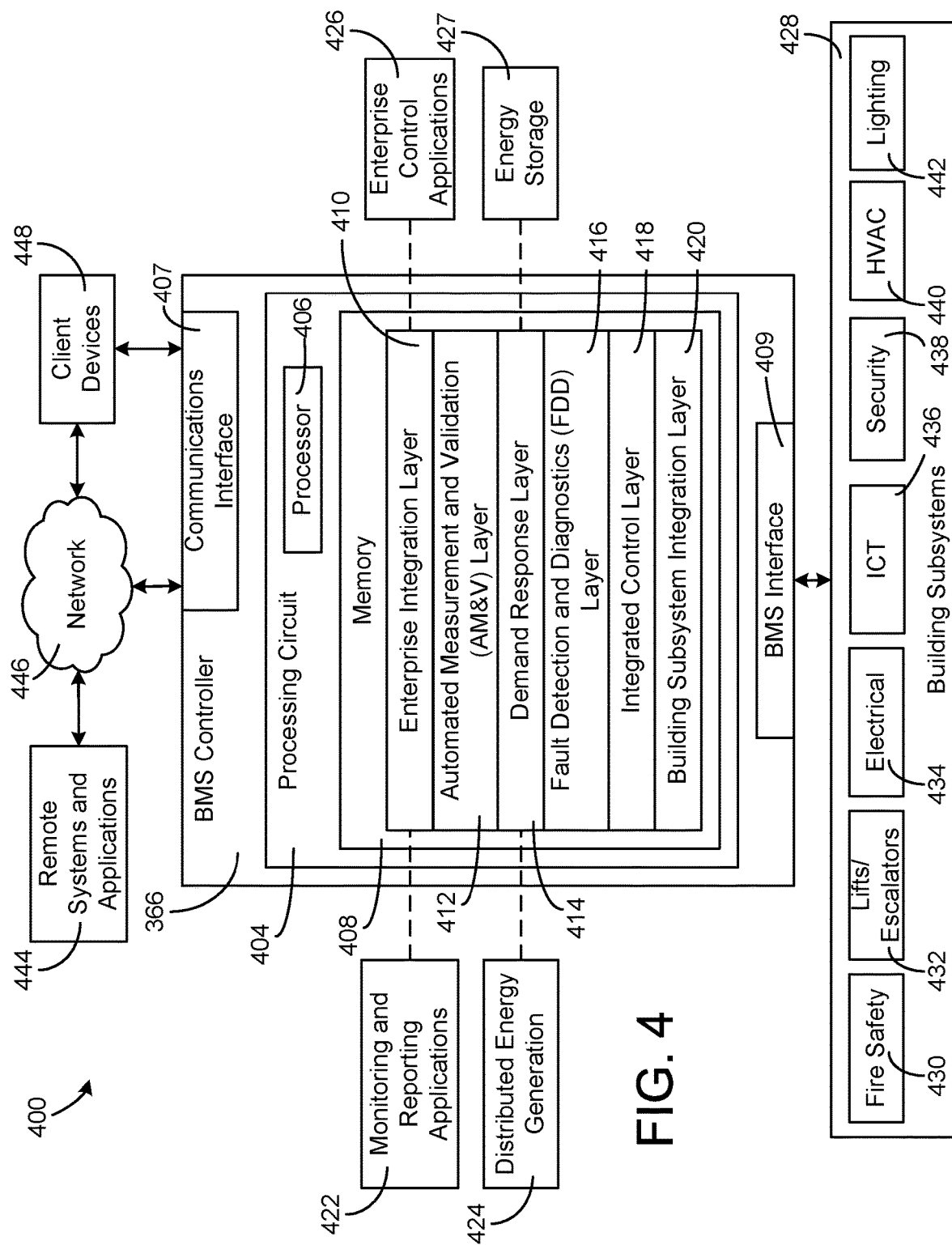
FIG. 4 is a schematic block diagram of a BMS which can be used in the building of FIG. 1, according to some embodiments.

Referring now to FIG. 4, a building automation system (BAS) 400 is implemented in building 10 to automatically monitor and control various building functions in some embodiments. BAS 400 includes BMS controller 366 and a plurality of building subsystems 428 in some embodiments. Building subsystems 428 include a building electrical subsystem 434, an information communication technology (ICT) subsystem 436, a security subsystem 438, a HVAC subsystem 440, a lighting subsystem 442, a lift/escalators subsystem 432, and a fire safety subsystem 430 in some embodiments. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 includes a communications interface 407 and a BMS interface 409 in some embodiments. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 includes a processing circuit 404 including a processor 406 and memory 408 in some embodiments. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers, computers (e.g., that can exist in distributed locations), or devices (e.g., including mobile electronic devices). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 includes an enterprise integration layer 410, an automated measurement and validation (AM&V) layer 412, a demand response (DR) layer 414, a fault detection and diagnostics (FDD) layer 416, an integrated control layer 418, and a building subsystem integration later 420 in some embodiments. Layers 410-420 can be configured to receive inputs from building subsystems 428 and other data sources, determine control actions (e.g., optimal control actions) for building subsystems 428 based on the inputs, generate control signals based on the control actions, and provide the generated control signals to building subsystems 428. Layers 410-420 are implemented as software modules or routines executed by the processor 406, by hardware circuits or combinations thereof. The following paragraphs describe some of the general operations performed by each of layers 410-420 in BAS 400.

Enterprise integration layer 410 is configured to serve clients or local applications with information and services to support a variety of enterprise-level applications in some embodiments. For example, enterprise control applications 426 is configured to provide subsystem-spanning control to a graphical user interface (GUI) or to any number of enterprise-level business applications (e.g., accounting systems, user identification systems, etc.) in some embodiments. Enterprise control applications 426 can also or alternatively be configured to provide configuration GUIs for configuring BMS controller 366. In yet other embodiments, enterprise control applications 426 can work with layers 410-420 to optimize or improve building performance (e.g., efficiency, energy use, comfort, or safety) based on inputs received at interface 407 and/or BMS interface 409.

Building subsystem integration layer 420 is configured to manage communications between BMS controller 366 and building subsystems 428 in some embodiments. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize or better use resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources in some embodiments. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine a set of control actions (e.g., optimal control actions). The equipment models can include, for example, thermodynamic models describing the inputs, outputs, and/or operations performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 is configured to use the data input or output of building subsystem integration layer 420 and/or demand response later 414 to make control decisions in some embodiments. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 is configured to provide on-going fault detection for building subsystems 428, building subsystem devices (i.e., building equipment), and control algorithms used by demand response layer 414 and integrated control layer 418 in some embodiments. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 is configured to output a specific identification of the faulty component or cause of the fault (e.g., loose damper linkage) using detailed subsystem inputs available at building subsystem integration layer 420 in some embodiments. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 is configured to store or access a variety of different system data stores (or data points for live data) in some embodiments. FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

Reinforcement Machine Learning for HVAC Systems

Figure 5:
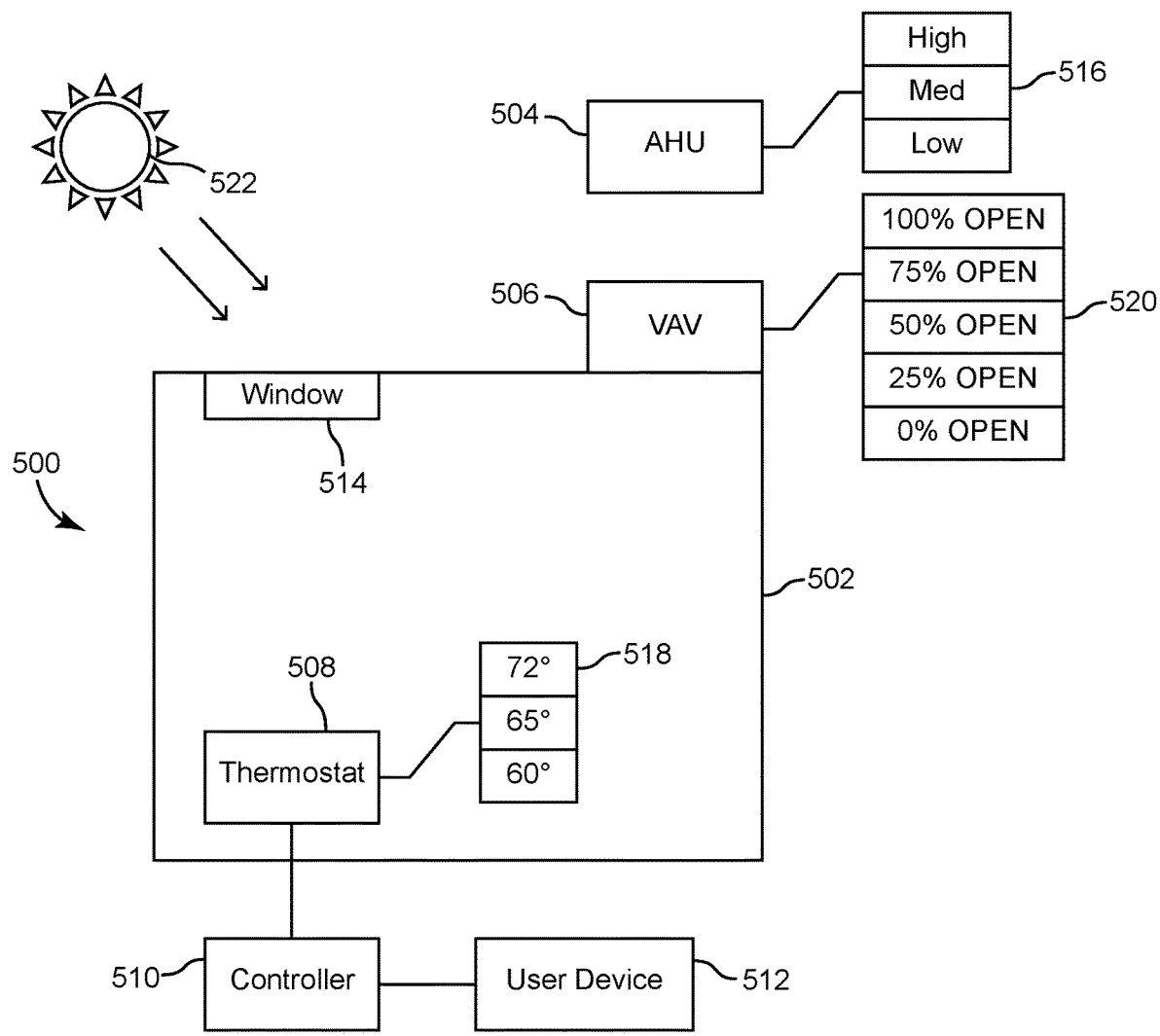
FIG. 5 is a schematic block diagram illustrating an environmental control system for a space is shown, according to some embodiments.

Referring now to FIG. 5, an environmental control system 500 associated with a space 502 is a building, a zone within a building, a room, or any other space in which the environmental factors can be controlled via one or more HVAC systems in some embodiments. The space 502 may be the building 10 as described with reference to FIG. 1. Furthermore, the one or more HVAC systems that control the space 502 may be the HVAC systems described with reference to FIGS. 1-4. The system 500 may include an AHU 504 which may be in communication with a VAV 506. The AHU 504 may be the same and/or similar to the AHU 106 as described with reference to FIG. 1 while the VAV 506 may be the same and/or similar to the VAVs 116 as described with reference to FIG. 1. The system 500 may further include a thermostat 508. The thermostat 508 is configured to communicate with a controller 510 in some embodiments. The controller 510 is described in more detail below. In some embodiments, the controller 510 may be integral to the thermostat 508, e.g., the controller 510 is a software module of the thermostat 508. A user device 512 is configured to communicate with the controller 510 in some embodiments. The space 502 may further include a window 514. The above examples of system 500 are not intended to be limiting, as it is contemplated that an environmental control system 500 generally may include more or fewer components as needed.

In some embodiments, the thermostat 508 and/or the controller 510 are configured to communicate with the VAV 506 and the AHU 504 for controlling a flow of air into or out of the space 502. For example the thermostat 508 and/or the controller 510 are configured to control one or more parameters of the AHU 504 and/or the VAV 506. In some embodiment, the thermostat 508 controls the AHU 504 by instructing it to provide a certain level of airflow to the VAV 506. For example, the thermostat 508 and/or the controller 510 can instruct the AHU 504 to provide one of a finite levels of airflow, such as shown in AHU parameter list 516. The AHU parameter list 516 can allow the thermostat 508 and/or the controller 510 to select from operational levels including "high" airflow, "medium" airflow, or "low" airflow. The airflow levels can correspond to various supply fan speeds of a supply fan of the AHU 504. However, other operational levels within the AHU parameter list 516 are also contemplated. The thermostat 508 and/or the controller 510 can select an operational level of the AHU 504 to achieve one or more setpoints. For example, the thermostat 508 can be configured to allow for temperature setpoints to be entered, which can be stored in thermostat parameter list 518. While thermostat parameter list 518 includes temperatures, the thermostat 508 may allow other setpoints, such as airflow, humidity, etc. to be entered as well.

The thermostat 508 and/or the controller 510 may further communicate with VAV 506 to control a position of the VAV 506. As shown in VAV parameter list 520, the VAV 506 may be selected to operate in a finite number of positions. The positions may be finite damper positions for a damper of the VAV 506 that a controller of the VAV 506 can controller. However, in some embodiments, the damper positions may be continuous from a fully open damper position to a fully closed damper position. However, in other embodiments, VAV 506 may be operated in more or fewer positions than those shown in VAV parameter list 520. The thermostat 508 and/or the controller 510 are configured to control both the AHU 504 and the VAV 506 to reach the one or more desired setpoints for the space 502 in some embodiments.

In some embodiments, the setpoints stored in thermostat parameter list 518 may be entered by a user directly into the thermostat 508. Alternatively, the user may be able to enter the setpoints into the thermostat either via the controller 510 or via a user device 512 in communication with the thermostat 508 and/or the controller 510. In some embodiments, the setpoints may be set based on a schedule stored within the thermostat 508. The schedule may be contain multiple setpoints associated with one or more environmental conditions of the space 502 during a day. However, the schedule may further expand to provide desired setpoints for multiple days, weeks, or even months and/or years. The schedule may be established to provide optimal or improved comfort levels to occupants of the space over time.

In some examples, a user may be allowed to input their own setpoints to override the setpoints associated with a schedule. This may occur when the user is uncomfortable due to the environmental conditions of the space 502. For example, some users may find certain environmental conditions more comfortable than other users. In one example, a husband and a wife may share a space, and the husband may prefer cooler temperatures, while the wife may prefer warmer temperatures. Additionally, other setpoint changes may be prompted by other conditions. For example, when direct sunlight from sun 522 enters the space 502 via the window 514, solar radiation may cause a portion of the room to be substantially warmer than another portion of the room, causing a user to change the scheduled setpoint. The solar radiation may further increase the temperature beyond the desired setpoint rapidly, which can also cause a user to change the scheduled setpoint (e.g. lower the setpoint to counter the sudden rise in temperature). In other examples, conditions such as weather (e.g. rain, snow, fog, temperature, humidity, wind), time of day, time of year (e.g. position of sun in relation to windows, average temps, etc), and occupancy levels may all impact the setpoints.

Figure 6:
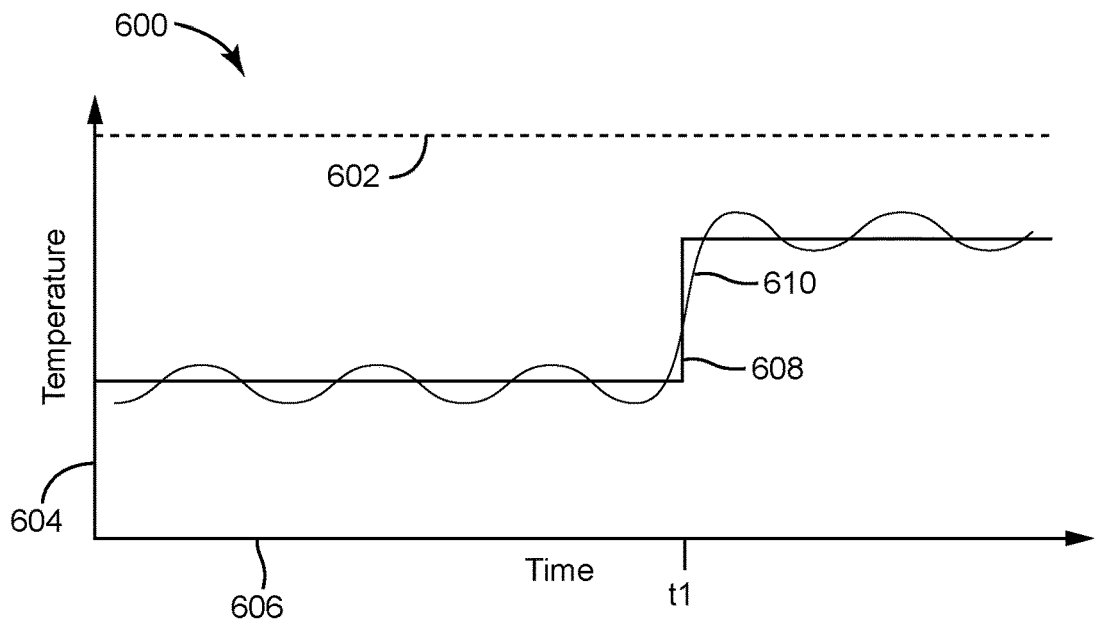
FIG. 6 is a graph illustrating setpoint regulation by a thermostat, according to some embodiments.

Referring now to FIG. 6, a graph 600 illustrating setpoint regulation by a thermostat is shown, according to an exemplary embodiment. The graph 600 may represent both an outside air temperature (OAT) 602 (shown on temperature axis 604) over time (shown on time axis 606), as well as a temperature setpoint 608. The actual temperature 610 is the temperature of the space 502 over time. As shown in FIG. 6, the thermostat 508 and/or the controller 510 work to control the temperature 610 based on the setpoint value 608. The thermostat 508 and/or the controller 510 attempt to control the temperature 610 to within a certain level of setpoint 608 as shown in FIG. 6. By modifying how closely the temperature 610 tracks the setpoint 608, the thermostat 508 and/or the controller 510 can attempt to optimize or improve the energy usage required to maintain the setpoint. However, when the setpoint is changed, such as at time t1 where the setpoint 608 steps up in value, the thermostat 508 and/or the controller 510 must expend additional energy to achieve the new setpoint. For purposes of this disclosure, the unplanned setpoint change can be referred to as a penalty. In some embodiments, a penalty is a user opening the window 514, turning on a room fan, etc. As will be described in more detail below, the controller 510 may be configured to minimize the occurrence of penalties. In some embodiments, the thermostat 508 and/or the controller 510 is integrated with sensors and/or controllers associated with the window 514 or a room fan of the space 502 that can indicate whether or not the window 514 is opened or whether a room fan is turned on. The thermostat 508 and/or the controller 510 may use various control schemes to attempt to regulate the temperature, including proportional-integral-derivative (PID) control.

Figure 7:
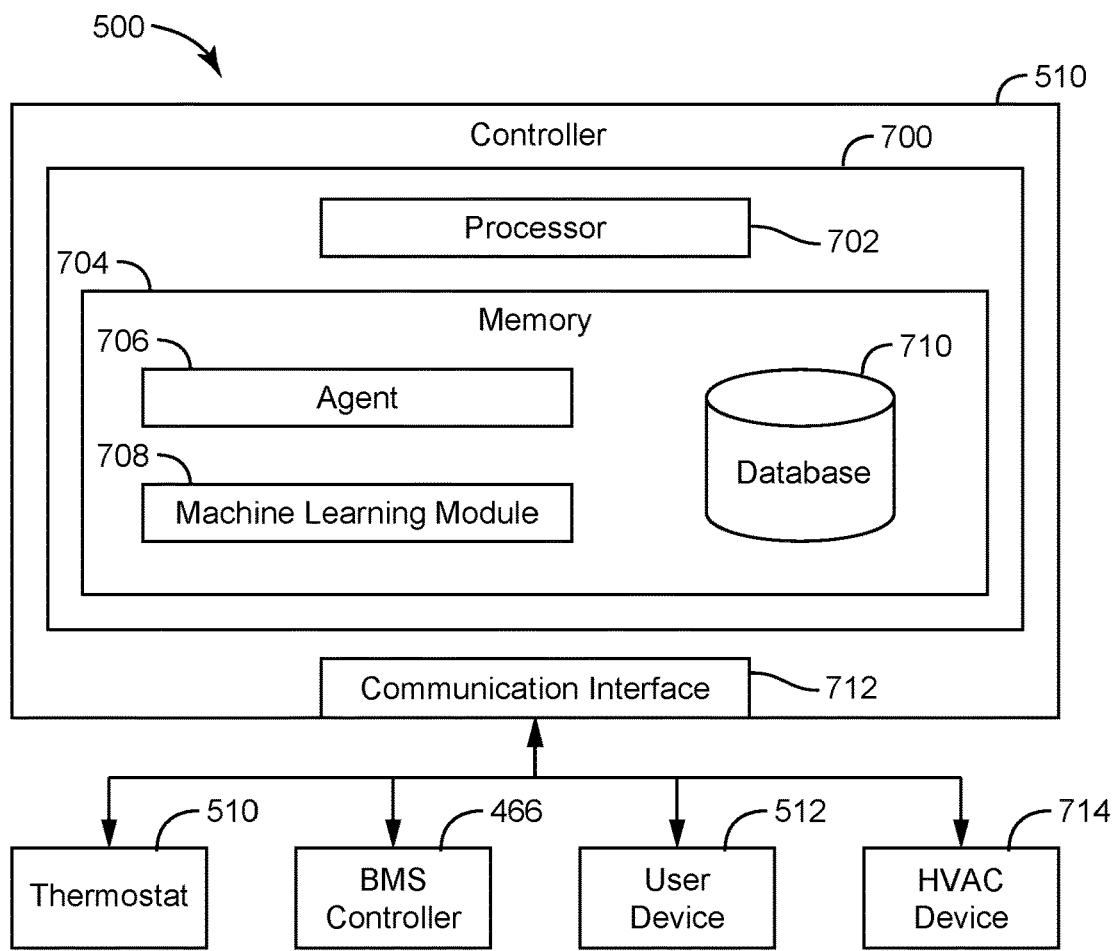
FIG. 7 is a schematic block diagram illustrating the controller of FIG. 5 in greater detail, according to an exemplary embodiment.

Referring now to FIG. 7 a block diagram illustrating the controller 510 in greater detail is shown, according to an exemplary embodiment. While controller 510 is shown in FIG. 5 to be separate from the thermostat 508, it is contemplated that in some embodiments, the controller 510 may be integral to the thermostat 508. The controller 510 includes a processing circuit 500. However, in some embodiments, the controller 510 includes multiple processing circuits 500. The processing circuit 700 includes a processor 702 and a memory 704. The processor 702 may be a general purpose or specific purpose processor, an application specific integrated circuit (ASIC), one or more field programmable gate arrays (FPGAs), a group of processing components, or other suitable processing components. The processor 702 may be configured to execute computer code or instructions stored in the memory 704 or received from other computer readable media (e.g., CDROM, network storage, a remote server, etc.).

The memory 704 may include one or more devices (e.g., memory units, memory devices, storage devices, etc.) for storing data and/or computer code for completing and/or facilitating the various processes described in the present disclosure. The memory 704 may include random access memory (RAM), read-only memory (ROM), hard drive storage, temporary storage, non-volatile memory, flash memory, optical memory, or any other suitable memory for storing software objects and/or computer instructions. The memory 704 may include database components, object code components, script components, or any other type of information structure for supporting the various activities and information structures described in the present disclosure. The memory 704 may be communicably connected to the processor 702 and may include computer code for executing (e.g. by processor 702) one or more processes described herein.

For example, memory 704 includes an agent module 706 and a machine learning module 708. The agent module 706 may include one or more software agents configured to gather data from various devices or system associated with system 500, as will be described in more detail below. The machine learning module 708 may process data gathered by the agents module 706. In some embodiments, the machine learning module 708 contains one or more agents for evaluating data received from the agent module 706. The machine learning module 708 is configured to analyze the data received from the agents module 706 in order to configure one or more devices in system 500 to operate to avoid penalties, where possible, in some embodiments. The memory may further include a database 710. The database 710 may be used to store the data collected by the agent module 706. Further, the machine learning module 708 may be able to access the data stored in the database 710 for analysis. Systems and methods for agent-based BAS systems is further described in U.S. patent application Ser. No. 15/367,167, now U.S. Pat. No. 9,817,383, filed Dec. 1, 2016, U.S. patent application Ser. No. 15/586,104 filed May 3, 2017, and U.S. patent application Ser. No. 15/968,278 filed May 1, 2018 the contents of which are incorporated herein in their entireties.

The controller 510 may further include a communication interface 712. The communication interface 712 may include wired or wireless interfaces (e.g. jacks, antennas, transmitters, receivers, transceivers, wire terminals, etc.) for conducting data communications with various systems, devices, or networks. For example, the communications interface 712 may include an Ethernet card and port for sending and receiving data via an Ethernet-based communications network. The communication interface 712 may be configured to communicate via local area networks or wide area networks, (e.g., the Internet, a building WAN, etc.) and may use a variety of communications protocols (e.g., BACnet, IP, LON, etc.).

The communication interface 712 may include a network interface configured to facilitate electronic data communications between the controller 510 and one or more other devices. For example, the communication interface 712 may provide electronic data communication between the thermostat 508, the BMS controller 466, the user device 512 and or one or more HVAC devices 714. Example HVAC devices 714 may include AHU 504 and/or VAV 506. However, other HVAC devices may include lighting controllers, automatic window shades, humidifiers, dehumidifiers, ventilators, exhaust fans, or other HVAC devices which can include the environmental conditions of the space 502.

Figure 8:
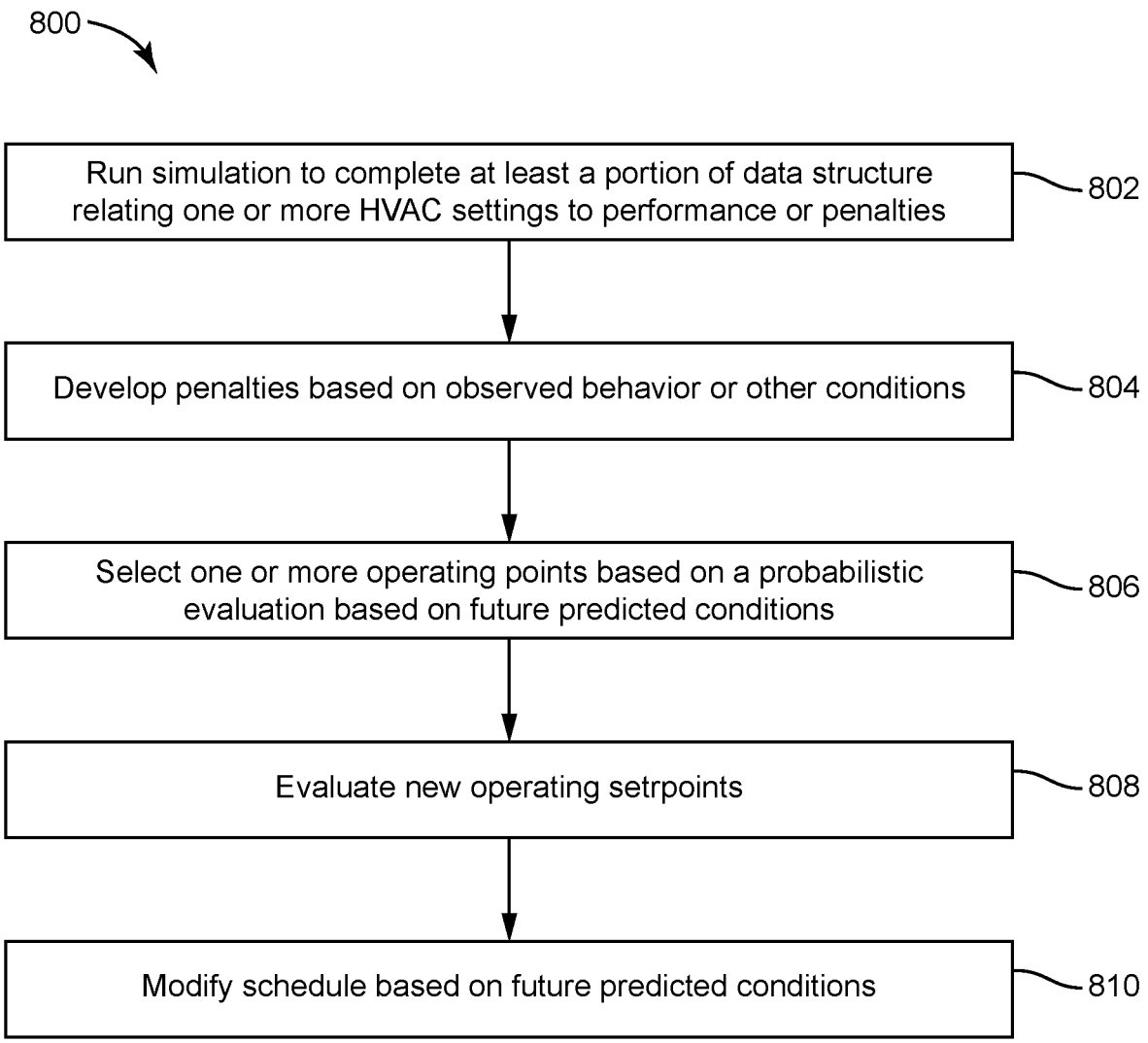
FIG. 8 is a flow chart illustrating a reinforcement machine learning process, according to some embodiments.

Referring now to FIG. 8, a flow chart illustrating a reinforcement machine learning process 800 is shown, according to an exemplary embodiment. The controller 510 can be configured to perform the process 800. In some embodiments, the thermostat 508, the BMS controller 466, the user device 512, and/or the HVAC devices 714 are configured to perform the process 800. Although the process 800 is described with reference to the controller 510, any computing device as described herein can be configured to perform the process 800.

At process block 802, a simulation is run to complete (generate) at least a portion of a data structure relating one or more HVAC settings to performance and/or penalties. In one embodiment, the agents module 706 performs the simulation. However, in other embodiments, the machine learning module 708 may perform the simulations.

The simulation may include collecting real and/or simulated data by varying the operation of the one or more HVAC devices (e.g. AHU 504, VAV 506, thermostat 508) over time and/or physically controlling the one or more HVAC devices and/or simulating the control of the one or more HVAC devices. In one embodiment, the simulation may vary various operating setpoints of the HVAC devices based on various external conditions. For example, the controller 510 may vary AHU 504 and/or VAV 506 operating setpoints based on factors such as time of day, outdoor temperature, the presence or absence of direct sunlight, the weather, an indoor or outdoor humidity, position of blinds or shades, wind, or other environmental factor during the simulation. The controller 510 may then determine how the modification of the setpoints of the HVAC equipment affects one or more environmental setpoints, such as the temperature setpoint. Where there is an adverse effect on the setpoint, such as when additional modification are required to maintain the setpoint, the controller may notate that a "penalty" occurred as additional changes were required.

In some embodiments, the simulation is a physical modeling test where the controller 510 performs physical control of the building equipment to determine the penalties. In some embodiments, the physical modeling test and a virtual simulation are combined, for example, the controller 510 can perform the physical modeling by varying equipment parameters to generate models used to run a virtual simulation.

In some embodiments, the simulation is a virtual modeling simulation where no actual physical control is performed. In such a simulation, the controller 510 may store one or more models (e.g., thermal building models, weather models, equipment models, etc.) and simulate the models based on varying parameters, e.g., equipment parameters, weather conditions, etc. to determine penalties. The models used to perform the simulation can be generated by the controller 510 based on data collection performed by the controller 510. For example, the controller 510 can collect equipment settings, times of day, weather conditions (e.g., position of sun, rain, sunshine amount, equipment runtimes, etc.) to generate the models for the simulations. In some embodiments, a user can input information amount their equipment, the type of equipment, the age of the equipment, the square footage of their home, the number and/or size of windows that are in the home, etc. The controller 510 can use this user defined input to building and/or run the simulation models.

The controller 510 may store the received data in a data structure. The data structure may be stored in a database, such as database 710. A sample data structure 900 is shown in FIG. 9. The data structure 900 may have a condition identifier column 902, an AHU Action column 904, a VAV Action column 906, a sunlight column 908, an outdoor air temperature column 910, an indoor temp before column 912, an indoor temp after column 914, an opportunities column 916, a penalty column 918, and an observations column 920, and a probability column 922. It is contemplated that some data structures may include additional data, such as indoor/outdoor humidity, time of day, weather conditions, time of year, temperatures setpoint, etc. Additionally, in some embodiments, data structures may include parameters for other devices as well, including dampers, exhaust fans, blind positions, etc. In some embodiments, the data structure 900 includes as many data types as determined to be needed by the machine learning module 708 to adequately control the HVAC devices.

The condition column 902 may provide an identification number for a unique combination of conditions. For example, condition one may be associated with the AHU 504 being set to provide "medium" airflow, the VAV 506 being opened to 75% of maximum, direct sunlight shining on the space 502, and an outdoor air temperature of 72° F. The AHU action column 904 may include the setting of the AHU for the given condition. Similarly, the VAV action column 906 may include VAV settings for the given condition. In one embodiment, the AHU Action column 904 and the VAV action column 906 may represent the state of an AHU and a VAV, respectively, after a change has been made to modify an indoor environmental parameter. The sunlight column 908 may include data related to the amount of sunlight associated with the space being monitored. For example, the sunlight column 908 may include information indicating direct sunlight, indirect sunlight, or no sunlight (e.g. night time) for a given condition. The outside air temperature (OAT) column 910 may include data relating to an OAT for a given condition.

The Indoor Temperature Before column 912 may provide an indication of the indoor air temperature prior to an action being taken for a given condition. Similarly, the Indoor Temperature After column 914 can provide an indication of the indoor air temperature after an action was taken for a given condition. The opportunities column 916 provides a count of the total observations related to certain actions or conditions. For example, the opportunities column indicates that an aspect of condition one (e.g. AHU action at Medium) occurred 385 times, and a different aspect (e.g. AHU action at High) occurred 325 times. In some embodiments, the Opportunities column may count combinations of aspects, such as the number of times that the AHU Action, the VAV Action, the Sunlight and the OAT occur in a specific combination. For example, in condition one, the indoor temperature before of 68° F. and an indoor temperature after of 70° F. may have occurred nine times. While in condition two, an indoor temperature before temperature of 68° F. and an outdoor temperature of 69° F. may have occurred 88 times. By analyzing the ratio of opportunities to observations, a probability can be determined for the observed conditions. For example, condition one is indicated as having a 2.3% probability of occurring (9/385=2.3%). This probability may be used to predict an occurrence of a given condition, and shown in the probabilities column 922.

The penalty column 918 may include a count of penalties that have been recorded for the given parameters for condition one. In some embodiments, the penalties may be identified as associated with a user, such as a husband or wife, other occupants of the space 502, or a simulation. The penalty count can allow for the machine learning module 708 to perform various probabilistic, statistical, or other types of analysis for each unique condition. Further, the machine learning module 708 may also use other data, such as the probability data in probabilities column 922 to perform the various probabilistic, statistical or other analysis types on the collected data. Thus, the data structure will contain a condition for each unique set of parameters that occur, along with a count of the number of times the combination of parameters (e.g. condition) has occurred, as well as all penalties recorded for the particular condition. The penalty count can also be used to help determine a logic chain of pre-determined actions.

In some embodiments, by using the number of penalties and the number of times that the one or more HVAC parameters and/or environmental conditions were logged, the controller 510 can determine a probability that a particular HVAC parameter will experience a penalty. To select optimal and/or improved HVAC parameters, the controller 510 can be configured to select the lowest penalty probability based on the data structure 900 and/or the lowest number of time a penalty has occurred.

Returning again to FIG. 8, it is understood that the simulation may populate the data structure with multiple conditions by varying various parameters and/or recording other parameters, non-controllable parameters, such as sunlight (position of sun, position of blinds, time of year), weather (e.g. wind, humidity levels, outdoor air temperature, precipitation), time of day, time of year, occupancy levels, etc.

At process block 804, the controller 510 may evaluate the data gathered from the simulation, as well as real time data to develop one or more penalties based on observed behavior or other conditions. In some embodiments, the agents module 706 may perform the simulations. However, for clarity, it is the controller 510 that is referenced as performing the simulations in some embodiments. For example, the controller 510 may detect penalties, e.g., unplanned setpoint changes, and record the penalties in the data structure 900 along with one or more parameters that occurred at the time of the penalty. As described above, in some embodiments, the penalties may be associated with a specific user, such as a husband and wife. The controller 510 may analyze the parameters at the time the penalty occurred, and store that information in the data structure 900. In some embodiments, the controller 510 may perform multiple iterative simulations to determine multiple possible effects on the environmental conditions of the space 502 and store the results in the data structure 900.

At process block 806, the controller 510 may select one or more operating points based on an evaluation of current and/or future prediction conditions. For example, the controller 510 may evaluate the current or predicted non-controllable conditions, such as sunlight, outdoor air temp, etc., and modify the AHU 504 and VAV 506 parameters (or other HVAC devices) to values that are associated with the condition having the lowest occurrence of penalties. In some embodiments, the controller 510 may perform a probabilistic analysis on the data within the data structure to find the optimal and/or improved operating conditions for the various HVAC devices (e.g. resulting in the minimum number of penalties.) However, in other examples, the controller 510 may use other analysis methodologies such as regressions, statistical analysis, and the like to determine optimal and/or improved operating points. In some embodiments, the controller 510 may be capable of performing physics simulations based on certain attributes of the space 502. For example, the controller 510 may look at R values of the space, the number of windows, the type of windows, number and placement of ventilation and air registers, and/or other values to determine how best to control the HVAC equipment to reduce penalties. In some examples, the controller 510 may allow a user to override the automatic setpoint selection, such as when a construction is being performed, when no occupants will be in the space 502, etc.

In some embodiments, the future conditions may be or may be based on a weather forecast. The weather forecast may indicate sunlight levels, outdoor air temperature values, etc. The controller 510 can receive the weather forecast from a weather server by communicating with the server via a network, e.g., sending a request for a weather forecast and/or receiving the weather forecast, the received weather forecast may be received in response to the request. In some embodiments, the controller 510 can perform various data simulations to determine the future weather data. For example, the controller 510 can store various models and/or recorded based environmental data. Based on the models and/or past environmental data, the controller 510 can predict the future environmental conditions.

At process block 808, the controller 510 may evaluate the new operating points over time to determine their effectiveness. Specifically, the controller 510 can continue to determine what, if any, penalties are received for certain conditions based on using the modified operating points. These results may be added to the data structure 900 as well. The controller 510 may be further configured to perform additional iterative analysis techniques to further refine the operating points for each set of non-controllable parameters (e.g. outdoor temperature, sunlight, time of day, occupant, etc.).

At process block 810, the controller 510 may modify an entire schedule using the determined operating points based on predicted future conditions. In one embodiment the controller 510 may be able to communicate with one or more weather services which can provide the predicted weather at a future time (e.g. a weather forecast). For example, the weather services may provide information such as expected outdoor air temperature, weather (e.g. sunny, overcast, rain, snow, foggy, windy), humidity, etc. Further, the controller 510 may have sufficient data to predict when certain occupants may be using the space 502. Based on this information, the controller 510 selects setpoints for the HVAC equipment (e.g. AHU 504, VAV 506), as well as possible temperature setpoints based on one or more predicted conditions. In one embodiment, the controller 510 selects setpoints based on previously selected setpoints used during similar conditions to the predicted conditions. For example, the controller 510 may attempt to select setpoints for the HVAC equipment based on the predicted conditions that correspond with setpoints having the minimal amount of penalties (or a lowest probability of penalties) for the given predicted conditions.

Figure 10:
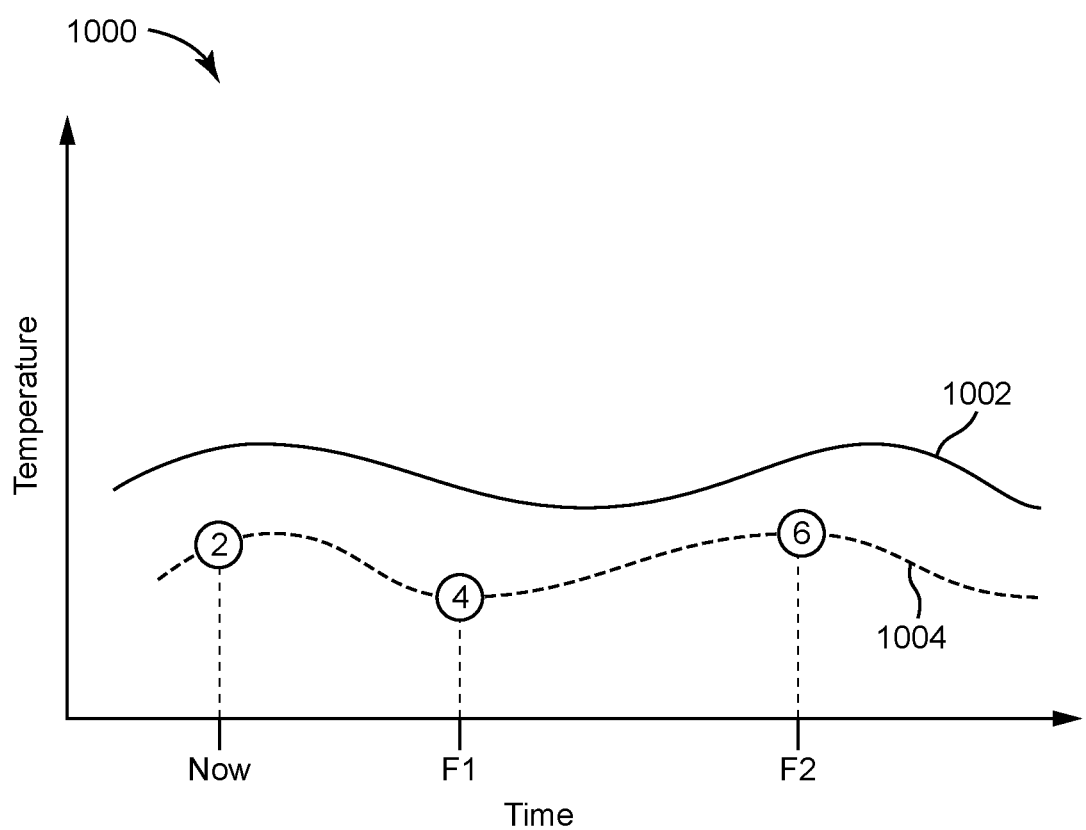
FIG. 10 is a graphical representation of an environmental control schedule, according to some embodiments.

Referring now to FIG. 10, an example schedule 1000 is shown wherein the y-axis represents temperature and the x-axis represents time is shown, according to an exemplary embodiment. The predicted outside air temperature is represented by line 1002, while the scheduled temperature setpoint is represented by line 1004. As shown on line 1004, various points associated with a condition from data structure 900 are shown. For example, point 2 may be associated with condition two in the data structure, and so on. Thus, at point 2, the non-controllable conditions (e.g. OAT, sunlight, weather conditions, occupancy levels) may be the same as those recorded in data structure condition two. For example, point 2 may represent an outdoor air temperature of 77° F. and indirect sunlight. Accordingly, the controller 510 may then set the VAV 506 to 50% open, and the AHU to "High." In one embodiment, the controller 510 selects these parameters for the HVAC equipment as there may be no, or very few penalties associated with those settings based on the OAT and sunlight affecting the space 502. In some embodiments, the controller 510 may be able to control other parameters, such as shade positions, ventilator, fans, and the like.

The controller may further control the HVAC devices to their optimal points or improved points based on the predicted conditions for a future time period. For example, point 2 may be associated with a current condition, while points 4 and 6 (associated with conditions four and six of the data structure), are based on the future conditions (e.g. future weather conditions such as temperature, sunlight, weather reports, etc.). Thus, the controller 510 may be capable of optimizing or improving the operating schedule for the HVAC devices associated with the space into the future, based on received weather information. Further, as weather information changes, the controller 510 may be configured to dynamically modify the schedule to ensure optimal operation and/or improved operation and minimal penalties.

In some embodiments, the predicted conditions may be predicted using a deep neural network. In one embodiment, the deep neural network may be integrated into the machine learning module 708. In other embodiments, other modules within the controller 510 may be configured to perform the deep neural network analysis. The deep neural network may be used to build probability to handle unobserved situations. In one embodiment, the deep neural network may use a Monte Carlo tree search to build action and/or actuation sequences to optimize and/or improve one or more conditions. For example the built action and/or actuation sequences may be used to optimize and/or improve comfort, energy savings, etc., using the Monte Carlo tree search. A Monte Carlo tree search is a method for determining optimal and/or improved decisions by taking random samples in the decision space and building a search tree based on the results. In some embodiment, the Monte Carlo tree search may build a tree, such as a game tree, which is built in an incremental and asymmetric manner. For each iteration within the tree, a tree policy may be used to find a highest priority node within the tree. The tree policy may attempt to balance between exploration and exploitation. A summary of a Monte Carlo Tree search method may be found in "A Survey of Monte Carlo Tree Search Methods," by Brown et al., in IEEE Transactions on Computational Intelligence and AI in Games, Vol. 4, No. 1, March 2012.

For example, where the controller 510 has access to a weather forecast and a sunlight direction forecast, the controller 510 can then compute future setpoints (e.g. setpoints 4 and 6 as shown in FIG. 10). The future set points, and the associated conditions (e.g. AHU Actions, VAV Actions, etc.) may be determined using a Monte Carlo tree search using a game tree. In some embodiments, the controller may factor in the number of penalties associated with a given condition when establishing the set points. For example, conditions with lower penalty counts may be given priority over conditions with higher penalty counts for given conditions. Thus, for certain predicted parameters (e.g. OAT, sunlight, etc.) it may be determined that while one condition may be better used for the predicted parameters to conserve energy, that condition may be associated with multiple penalties. In contrast, a separate condition may use more energy but be associated with fewer penalties. Thus, the controller may prioritize the condition with fewer penalties when setting future setpoints.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for controlling energy usage of one or more building devices associated with a building space, the method comprising:
   simulating, by one or more processing circuits, one or more operating values of the one or more building devices for a plurality of environmental conditions by varying the one or more operating values;
   determining, by the one or more processing circuits, penalties associated with the one or more operating values of the one or more building devices by detecting and recording user behavior that causes a value of at least one of the plurality of environmental conditions of the building space to change, determining the penalties comprising increasing a number of the penalties associated with a first set of the one or more operating values responsive to detecting the user behavior that causes the value of one or more of the plurality of environmental conditions associated with the first set of the one or more operating values to change;
   selecting, by the one or more processing circuits, one or more selected operating values from the one or more operating values based on one or more predicted environmental conditions and a penalty probability associated with each of the one or more operating values, wherein the penalty probability is based on the number of the penalties; and
   operating, by the one or more processing circuits, the one or more building devices to control a physical condition of the building space based on the one or more selected operating values.

2. The method of claim 1, wherein the penalties include an unscheduled environmental setpoint change initiated by a user, wherein the unscheduled environmental setpoint change comprises a change to at least one temperature setpoint.

3. The method of claim 1, wherein the method further comprises modifying, by the one or more processing circuits, an operating schedule of the one or more building devices based on the one or more selected operating values;
   wherein operating, by the one or more processing circuits, the one or more building devices based on the one or more selected operating values comprises operating, by the one or more processing circuits, the one or more building devices to control the physical condition of the building space based on the operating schedule.

4. The method of claim 1, wherein selecting, by the one or more processing circuits, the one or more selected operating values from the one or more operating values comprises:
    determining the number of the penalties associated with each of the one or more operating values; and
    selecting the one or more selected operating values to be one or more least penalized operating values of the one or more operating values, the one or more least penalized operating values being associated with a least penalty probability for the one or more predicted environmental conditions.

5. The method of claim 1, wherein the method comprises at least one of:
    receiving, by the one or more processing circuits, the one or more predicted environmental conditions by receiving a weather forecast from a weather server via a network; or
    determining, by the one or more processing circuits, the one or more predicted environmental conditions by predicting environmental conditions based on historical environmental condition data and one or more models.

6. The method of claim 1, wherein simulating, by the one or more processing circuits, the one or more operating values of the one or more building devices for the plurality of environmental conditions further comprises:
    physically operating, by the one or more processing circuits, the one or more building devices based on the one or more operating values; and
    monitoring whether an environmental setpoint is changed.

7. The method of claim 6, wherein monitoring whether the environmental setpoint is changed comprises determining whether a user changes a setpoint value of the environmental setpoint;
    wherein determining, by the one or more processing circuits, the penalties associated with the one or more operating values comprises determining a number of times the user changes the setpoint value of the environmental setpoint for each of the one or more operating values.

8. The method of claim 6, wherein the one or more building devices comprise an air handler unit (AHU) and a variable air volume (VAV) unit;
    wherein varying the one or more operating values comprises varying an AHU fan speed and varying a VAV unit damper position;
    wherein operating, by the one or more processing circuits, the one or more building devices based on the one or more operating values comprises controlling the AHU and the VAV unit based on the AHU fan speed and the VAV unit damper position.

9. The method of claim 1, wherein the method further comprises generating, by the one or more processing circuits, a data structure, wherein the data structure comprises the one or more operating values, the plurality of environmental conditions, and the penalties;
    wherein selecting, by the one or more processing circuits, the one or more selected operating values comprises selecting the one or more selected operating values from the data structure.

10. The method of claim 9, wherein the data structure comprises, for each of the one or more operating values, values of the plurality of environmental conditions associated with each of the one or more operating values and the number of the penalties associated with each of the one or more operating values.

11. The method of claim 9, wherein for each of the one or more operating values, the data structure comprises an associated:
    one or more weather values, wherein the one or more weather values are weather conditions at a time that an operating value was varied;
    the number of times of observations of the operating value; and
    the number of the penalties.

12. The method of claim 11, wherein for each of the one or more operating values, the data structure further comprises the penalty probability, the penalty probability based on a number of observations of the operating values and the number of the penalties.

13. The method of claim 12, wherein selecting, by the one or more processing circuits, the one or more selected operating values from the one or more operating values for the one or more predicted environmental conditions comprises selecting the one or more selected operating values based on a lowest penalty probability for each of the one or more operating values.

14. A controller for one or more building devices associated with a building space, the controller comprising a processing circuit configured to:
    determine penalties associated with the one or more operating values of the one or more building devices by detecting and recording user behavior that causes a value of at least one of one or more environmental conditions of the building space to change, wherein one or more operating values of the one or more building devices are simulated by varying the one or more operating values;
    select one or more selected operating values from the one or more operating values based on one or more predicted environmental conditions and a number of the penalties associated with each of the one or more operating values by:
        determining the number of the penalties associated with each of the one or more operating values, determining the number of the penalties comprising increasing the number of the penalties associated with a first set of the one or more operating values responsive to detecting the user behavior that causes the value of one or more of the one or more environmental conditions associated with the first set of the one or more operating values to change; and
        selecting the one or more selected operating values to be one or more least penalized operating values of the one or more operating values, the one or more least penalized operating values being associated with a least value of a penalty probability for the one or more predicted environmental conditions, wherein the penalty probability is based on the number of the penalties; and
    operate the one or more building devices to control a physical condition of the building space based on the one or more selected operating values.

15. The controller of claim 14, wherein the penalties include an unscheduled environmental setpoint change initiated by a user, wherein the unscheduled environmental setpoint change comprises a change to at least one temperature setpoint.

16. The controller of claim 14, wherein the processing circuit is configured to modify an operating schedule of the one or more building devices based on the one or more selected operating values;

wherein the processing circuit is configured to operate the one or more building devices based on the one or more selected operating values by operating the one or more building devices to control the physical condition of the building space based on the operating schedule.

17. The controller of claim 14, wherein the processing circuit is configured to simulate the one or more operating values of the one or more building devices for the one or more environmental conditions by:
   physically operating the one or more building devices based on the one or more operating values; and
   monitoring whether an environmental setpoint is changed.

18. The controller of claim 14, wherein the processing circuit is configured to generate a data structure based on a simulation, wherein the data structure comprises the one or more operating values, one or more environmental conditions, and the penalties;
   wherein the processing circuit is configured to select the one or more selected operating values by selecting the one or more selected operating values from the data structure;
   wherein for each of the one or more operating values, the data structure comprises an associated:
      one or more weather values, wherein the one or more weather values are weather values at a time that an operating value was varied;
      the number of times of observations of the operating value; and
      the number of the penalties.

19. An energy system for one or more building devices associated with a building space, the system comprising one or more processing circuits configured to:
   determine based on a simulation of one or more operating values of the one or more building devices for a plurality of environmental conditions by varying the one or more operating values, penalties associated with the one or more operating values of the one or more building devices by detecting and recording user behavior that causes a value of at least one of the plurality of environmental conditions of the building space to change, wherein a penalty is an unscheduled environmental setpoint change initiated by a user, wherein the unscheduled environmental setpoint change comprises a change to at least one temperature setpoint, wherein the one or more processing circuits are configured to determine the penalties comprising increasing a number of the penalties associated with a first set of the one or more operating values responsive to detecting the user behavior that causes the value of one or more of the plurality of environmental conditions associated with the first set of the one or more operating values to change;
   select one or more selected operating values from the one or more operating values based on one or more predicted environmental conditions and a penalty probability associated with each of the one or more operating values, wherein the penalty probability is based on the number of the penalties; and
   operate the one or more building devices to control a physical condition of the building space based on the one or more selected operating values.

20. The system of claim 19, wherein the one or more processing circuits are configured to select the one or more selected operating values from the one or more operating values by:
   determining the number of the penalties associated with each of the one or more operating values; and
   selecting the one or more selected operating values to be one or more least penalized operating values of the one or more operating values, the one or more least penalized operating values being associated with a least penalty probability for the one or more predicted environmental conditions.

* * * * *